Sept. 16, 1958  D. L. ARENBERG  2,851,884
MEANS FOR DETERMINING CRYSTAL ORIENTATION AND PURITY
Filed Sept. 13, 1951
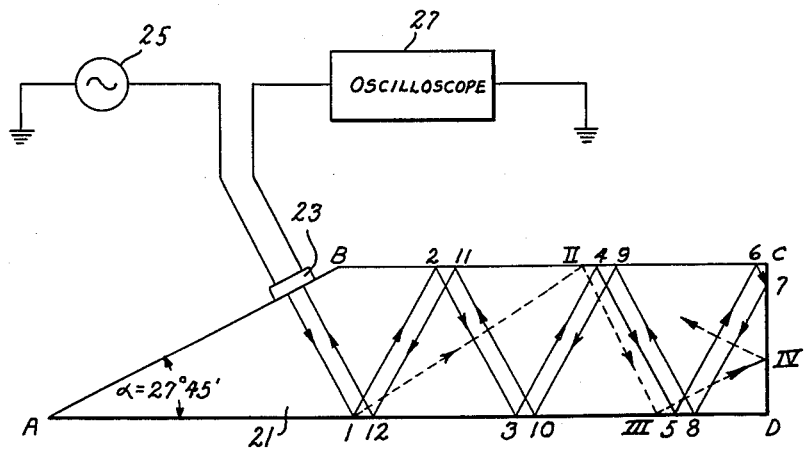
INVENTOR.
DAVID L. ARENBERG
BY
ATTORNEYS ়
United States Patent Office 2,851,884
Patented Sept. 16, 1958

2,851,884

MEANS FOR DETERMINING CRYSTAL ORIENTATION AND PURITY

David L. Arenberg, Rochester, Mass.

Application September 13, 1951, Serial No. 246,499

5 Claims. (Cl. 73—432)

(Granted under Title 35, U. S. Code (1952), sec. 266)

The invention described herein may be manufactured and used by or for the Government of the United States of America for governmental purposes without the payment of any royalties thereon or therefor.

This invention relates in general to measuring devices, and pertains more particularly to means for determining the orientation and purity of a crystal.

The orientation and purity of a crystal can best be checked by means of X-rays, by observing the diffraction pattern produced. Other means heretofore employed include optical methods, etch patterns, fracture patterns, and crystal habit. Each of these methods, however, is subject to disadvantages. While X-ray methods are most accurate, the equipment required therefor is costly and often unavailable. Optical methods that have been employed do not afford results of required accuracy. The etch and fracture techniques are unsatisfactory in that they alter the characteristics of or destroy the specimen.

The device herein described avoids such disadvantages and provides a simple and accurate means for checking the orientation of a piezo-electric crystal by utilizing normally available pulse generating and detecting equipment. The device is of most practical importance with crystals oriented to generate a pure mode, either shear or longitudinal. The unit described herein is for a shear crystal (AC cut in quartz). Other cuts will generate a combination of modes. Where a large number of one type of crystal are being used, a calibration run on the relative intensities of the different echoes for each type will aid in setting up standards of performance.

The primary object of this invention is to provide a simple and accurate piezo-electric crystal orientation tester.

Another object is to provide a device for checking the orientation of a piezo-electric crystal by the use of normally available and relatively inexpensive pulse generating and detecting equipment.

A further object is to provide an improved means for testing the orientation of a piezo-electric crystal and the purity of the wave generated thereby.

Other objects and advantages of this invention, as well as its construction, arrangement and operation, will be apparent from the following description and claims in connection with the accompanying drawing, wherein the single figure is a diagrammatic representation of means for testing the orientation and purity of generated waves of a piezo-electric crystal, showing a preferred embodiment of the invention.

A piece of fused quartz 21 is cut to have the cross-section shown in the figure, sides BC and AD being flat and parallel to each other while side DC is at right angles to sides BC and AD. The wedge angle $\alpha$, BAD, is 27°45′, which is the angle of incidence at which a shear mode wave of the SV type is converted completely to the longitudinal type. The fused quartz element 21 can be formed by truncating a rectangular parallelepiped with a plane oblique to the end. The resulting geometric solid would have a rectangular end, one edge of which would be CD; a sectional rectangular surface, one edge of which would be AB; two parallel rectangular faces, each having an edge corresponding to BC and AD; and two congruent polygons, ABCD and its counterpart lying in a parallel plane. A piezo-electric crystal 23 that is to be tested is mounted on the side AB and excited by a series of electrical pulses, spaced equally in time, from a suitable source 25. The crystal 23 is also coupled to an oscilloscope 27, where the echoes can be observed.

The plane of incidence of waves propagated from crystal 23 to face AD of the fuzed quartz solid 21 is a plane perpendicular to both face AB and the plane of the figure. This plane makes an angle with face AD equal to the complement of the angle of incidence. The orientation of crystal 23 on face AB determines the type of shear wave generated in the fuzed quartz 21. If the crystal is positioned so that the vibrations at face AB are parallel to the plane of the figure, the wave will be perpendicular to the plane of incidence and is defined as an SH type shear wave. If the crystal 23 is rotated 90° so that the vibrations are perpendicular to the plane of the figure, the wave will be parallel to the plane of incidence and is termed an SV type shear wave. Intermediate rotations will produce shear waves having both SH and SV components.

If the orientation as well as the cut of the crystal 23 is such that a pure SH type of shear wave is generated, so that vibration occurs perpendicularly to the plane of incidence, then the ultrasonic wave will travel in the path designated by the numerically sequential reflection points 1 to 12 and then back to the crystal 23, said wave being reflected at each of said points at an angle equal to the angle of incidence, the included angle being $2\alpha$. Since the angle BCD and the angle CDA are right angles, the wave travels, after striking reflection point 7, in a path parallel to the path from said crystal 23 to reflection point 6 and thus strikes the exciting crystal 23 normally. Consequently, part of the acoustic energy will be reflected back along the original circuit and part will be converted to electrical energy and transmitted to the cathode ray display tube or oscilloscope 27, where a series of signals spaced equally in time can be observed.

If the crystal 23 generates a wave of the longitudinal mode in part, or if the orientation of the crystal is such that vibration occurs parallel to the plane of incidence (an SV type of wave), then part of the acoustic energy at reflection point I and at each subsequent reflection point II, III, IV, etc. will be converted into another mode. These other modes will travel in different directions and with different velocities than the direction and velocity of the SH type of shear wave, where vibration is perpendicular to the plane of incidence, so that a different set of echoes will be observed: As shown in dotted lines in the figure, a very complex pattern will be produced on the oscilloscope, as the splitting occurs at every reflection point where the shear SV wave is incident at an angle $\alpha$, while the longitudinal mode generated will convert largely back to the shear SV mode.

By selecting the proper wedge angle, materials other than fused quartz can be employed in the practice of the subject invention. Where fused quartz is employed, the angle BAD is optimum at 27°45′. Such angle is the angle at which the mode conversion from the shear mode wave of the SV type (vibration parallel to the plane of incidence) is converted 100% to the longitudinal type of vibration. For media other than fused quartz, provided the Poisson ratio is less than 0.26, the wedge angle $\alpha$ will be the angle at which such conversion occurs. In addition, the purity and orientation of a longitudinally excited crystal can be observed, by the means described above, by utilizing fused quartz and making the angle BAD 46°, or by utilizing another medium and making the angle BAD equal to the angle of optimum mode conversion for that medium.

It is apparent that the device disclosed affords improvements over existing X-ray methods of determining the orientation and purity of a crystal. A readily available test means is assured when the more common ultrasonic pulse measuring equipment is present. Tests can be conducted economically, and with moderate space and time requirements, and such tests present clearly to the observer the purity of the shear wave generated by a given crystal. In addition, the subject means is adapted for use with those organic piezo-electric crystals of low density that cannot be analyzed by X-ray techniques.

Obviously many modifications and variations of the present invention are possible in the light of the above teachings. It is therefore to be understood that within the scope of the appended claims the invention may be practiced otherwise than as specifically described.

I claim:

1. In a piezoelectric crystal orientation tester, a fused quartz sound wave transmitting element including a wedge portion having a wedge angle of 27° 45' and a block portion having parallel opposite rectangular faces and an end face normal to said parallel faces whereby a piezoelectric crystal mounted on a wedge face of said element and cut to generate an SH type of shear wave will, when excited by an electrical pulse, radiate a sound wave only the SH component of which will be internally reflected multiply from said parallel faces, strike said end face and then be internally reflected back to said crystal via a path which is parallel to that previously taken by the sound wave before it reached said end face.

2. In a piezoelectric crystal orientation tester, a fused quartz sound wave transmitting element including a wedge portion having a wedge angle equal to the angle of incidence at which a shear mode wave of the SV type is converted completely to a wave of the longitudinal type and a block portion having parallel opposite rectangular faces and an end face normal to said parallel faces whereby a piezoelectric crystal mounted on a wedge face of said element and cut to generate an SH type of shear wave will, when excited by an electrical pulse, transmit a sound wave into said transmitting element only the SH component of which will be internally reflected multiply from said parallel opposite faces, then reflected once from said end face and finally internally reflected multiply from said parallel opposite faces so as to return to said crystal via a path which is parallel to that taken by said wave prior to its impingement upon said end face.

3. In a piezoelectric crystal orientation tester, a fused quartz sound wave transmitting element including a wedge portion having a wedge angle of 46° and a block portion having parallel opposite rectangular faces and an end face normal to said parallel opposite faces whereby a piezoelectric crystal mounted on a wedge face of said element and cut to generate a longitudinal wave will, when excited by an electrical pulse, transmit a sound wave into said transmitting element only the longitudinal wave component of which will experience first multiple internal reflections from said parallel opposite faces, then a single reflection from said end face and then further multiple internal reflections from said parallel opposite faces, returning to said crystal via a path which is parallel to that previously taken by said wave prior to its impingement on said end face.

4. For use in a system for determining the performance of a piezoelectric crystal cut to generate a shear wave of the SH mode when excited, a fused quartz rectangular parallelepiped truncated by a plane oblique to an end face so as to expose a rectangular sectional surface, said sectional surface being inclined at an angle of approximately 27° 45' with an adjacent lateral rectangular face, whereby a wave radiated from said crystal and introduced into said fused quartz at an angle normal to said sectional surface will have only that portion of its energy which is vibrating in said SH mode internally reflected back and forth between the parallel rectangular faces a multiplicity of times prior to striking the rectangular end face of said truncated rectangular parallelepiped and being returned to said sectional surface at an angle normal thereto via a path which is parallel to that previously taken by the energy before arriving at said rectangular end face.

5. For use in a system for determining the performance of a piezoelectric crystal cut to generate a pure longitudinal wave when excited, a fused quartz rectangular parallelepiped truncated by a plane oblique to an end face so as to have exposed a sectional surface, said sectional surface being inclined at an angle of approximately 46° with an adjacent lateral rectangular face whereby a sound wave radiated from said crystal and introduced to said fused quartz truncated rectangular parallelepiped at an angle normal to said sectional surface will have only that portion of its energy which is vibrating in a longitudinal mode first internally reflected a multiplicity of times from the parallel rectangular faces, then reflected from the rectangular end face of said truncated rectangular parallelepiped and then internally reflected a multiplicity of times from the parallel rectangular faces so as to return to said sectional surface at an angle normal thereto via a path which is parallel to that taken by the wave prior to its impingement upon said rectangular end face.

References Cited in the file of this patent

UNITED STATES PATENTS

| 2,525,861 | Carlin | Oct. 17, 1950 |
| 2,527,986 | Carlin | Oct. 31, 1950 |
| 2,592,135 | Firestone | Apr. 8, 1952 |

OTHER REFERENCES

Book by Carlin: Ultrasonics, pages 3–5, published April 8, 1949, by McGraw-Hill Co. (Copy in Div. 36.)